United States Patent [15] 3,697,688

Busch et al. [45] Oct. 10, 1972

[54] DEVICE FOR PRODUCING MULTI-COLOR TELEVISION IMAGES BY MAGNETIC FIELD CONTROL OF A PARTICULAR LUMINESCENT SCREEN

[72] Inventors: Georg Busch, Zurich; Peter Wachter, Zollikerberg, both of Switzerland

[73] Assignee: Verein zur Forderung der Feslkorperphysik an der Eidgenossischen Technischen Hochschule, Zurich, Switzerland

[22] Filed: Aug. 12, 1970

[21] Appl. No.: 63,044

[30] Foreign Application Priority Data

Jan. 21, 1966 Switzerland ................993/66

[52] U.S. Cl. ...............................178/5.4 R, 313/92 R

[51] Int. Cl. ..............................................H04n 9/22

[58] Field of Search.........178/5.4 EL, 5.4 R; 313/89, 313/92 R

[56] References Cited

UNITED STATES PATENTS 2,999,185 9/1961 Lubcke..................178/5.4 R

*Primary Examiner*—Robert L. Richardson
*Assistant Examiner*—George G. Stellar
*Attorney*—Watson, Cole, Grindle & Watson

[57] ABSTRACT

A device for the production of multi-colored TV images by a temporal sequence of monochromatic images corresponding to various color records of the original image to be transmitted in which a picture screen is made of a substance capable of luminescence forming the picture screen, a magnetic chemical compound with a magnetic field influencing the substance and means for the step-by-step change of the magnetic field in dependence on color control information contained in the TV signals.

8 Claims, 14 Drawing Figures

Figures 1, 3:
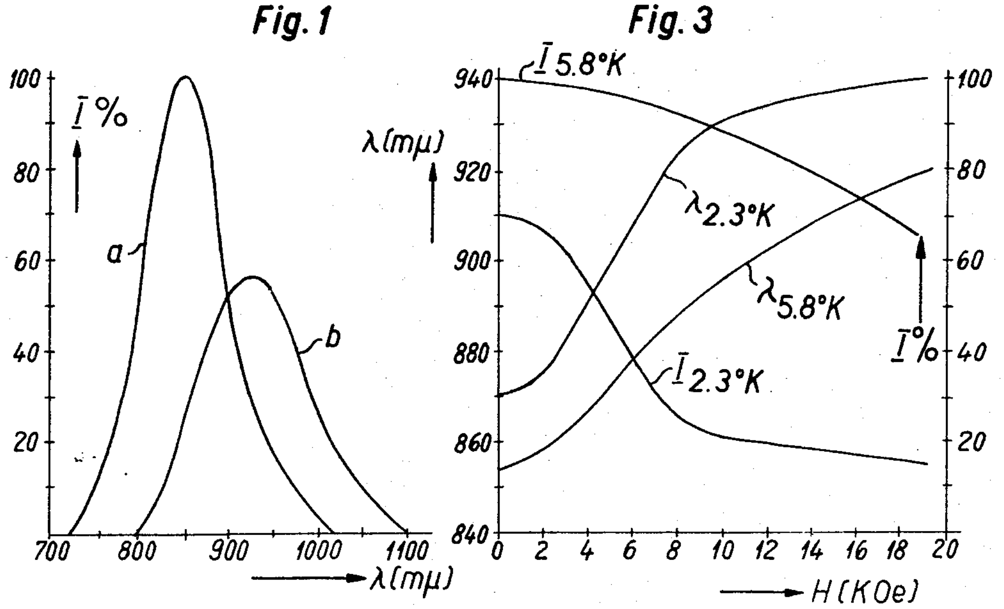

INVENTORS
Georg Busch
Peter Wachter
BY
Watson, Cole, Grindle & Watson
Attys.

INVENTORS
Georg Bosch
BY Peter Wachter
Watson, Cole, Grindle & Watson
Attys.

INVENTORS
Georg Busch
BY Peter Wachter
Watson, Cole, Grindle & Watson
Attys.

INVENTORS
Georg Busch
BY Peter Wachter
Watson, Cole, Grindle & Watson
Attys

INVENTORS
Georg Busch
BY Peter Wachter
Watson, Cole, Grindle & Watson
Attys.

DEVICE FOR PRODUCING MULTI-COLOR TELEVISION IMAGES BY MAGNETIC FIELD CONTROL OF A PARTICULAR LUMINESCENT SCREEN

This application is a Division of co-pending application, Ser. No. 611,057, filed Jan. 23, 1967, now U.S. Pat. No. 3,535,519.

At the present time, a large number of semiconductors and insulators are known which can be stimulated into luminescence by a light of a suitable wave length, by cathode rays or by radio-active radiation. The color of this luminescence may lie, depending on the substance, between the ultra-violet and the distant infra-red. Substances have been known where the luminescence centers or activators are determined by the method of production, and such substances where the activators are mixed intentionally into the basic substance as disturbing atoms. An ideally pure substance shows no luminescence. Once one or more activators have been built-in during the production of a luminophor, the color of the luminescence will have been fixed thereby. One can only influence the emission color somewhat in the case of the presence of several activators only by strong temperature changes (for example, between liquid nitrogen and room temperature). Even by the application of high electric and magnetic fields, one can only change the luminescence immaterially.

The possibilities of application of luminescence in industry and engineering, which even now are quite varied, could be enlarged considerably, if one would succeed in controlling the color by outside influences. That is the main goal and object of the present invention.

For some years now, substances have also been known which below a certain temperature (of the Curie-temperature) have a spontaneous magnetic order, similarly to iron at room temperature. These substances always contain, as connecting partners, chemical elements with no terminated inner electron shells. The magnetic order can be of a ferromagnetic, anti-ferromagnetic, meta-magnetic or ferrimagnetic kind.

It has now been found that it is possible to control the luminescence color of a substance capable of luminescence by using a magnetic chemical compound as the substance capable of luminescence, which compound contains at least one chemical element with a not terminated inner electron shell as a partner in the compound and contains additionally activators, and in that this compound is subjected to the influence of a magnetic field which is changed for the purpose of control of the luminescence color. For practical purposes, at least one of the partners of the compound will be selected from the rare earths, from the transition elements or from the actinides. Thus, one of the partners to the compound can be, for example, cerium, praseodymium, neodymium, samarium, europium, gadolinium, terbium, dysprosium, holmium, erbium, thulium, scandium, titanium, vanadium, chromium, manganese, iron, cobalt, nickel, thorium or uranium.

The magnetic compound capable of luminescence can be arranged, for example, within the effective range of a magnetic coil and the color of luminescence can be controlled by a change of the energized current flowing through the coil.

Figure 2:
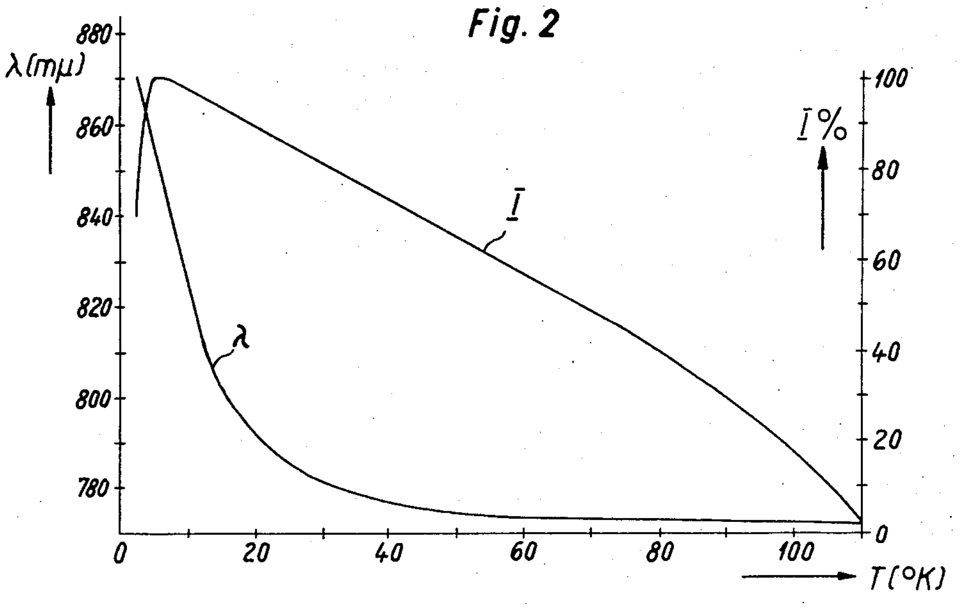
Figure 4:
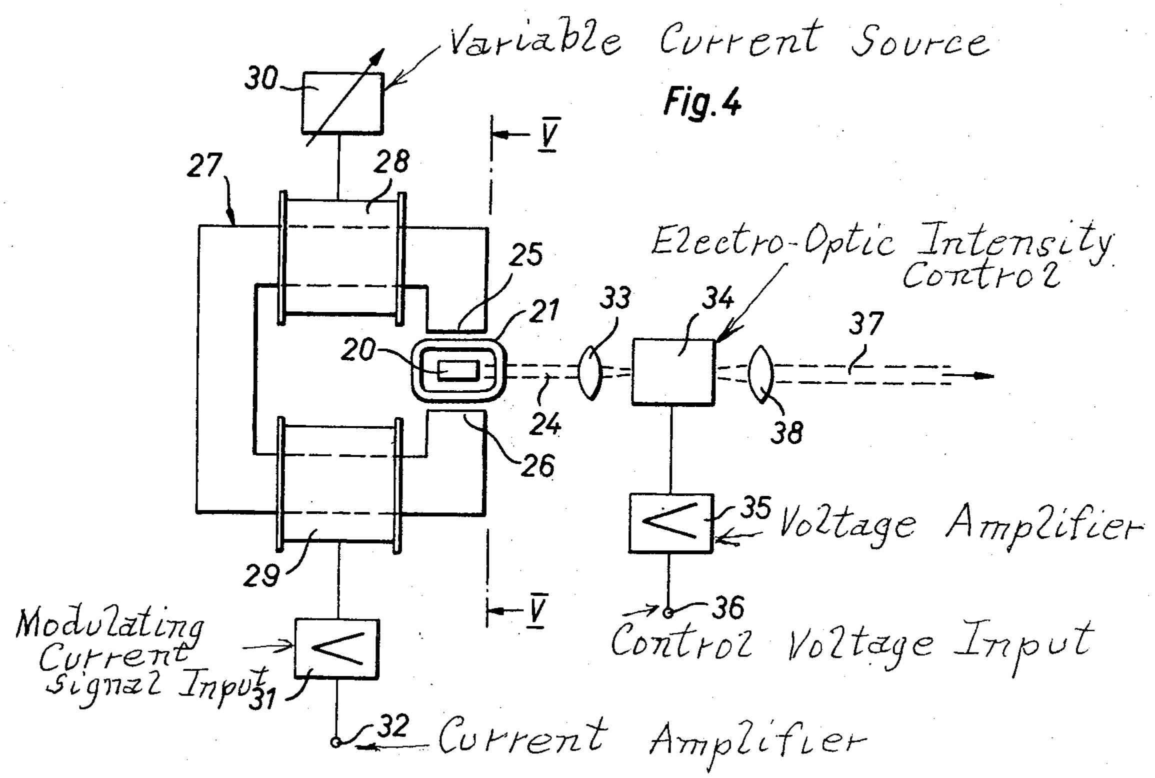
Figure 5:
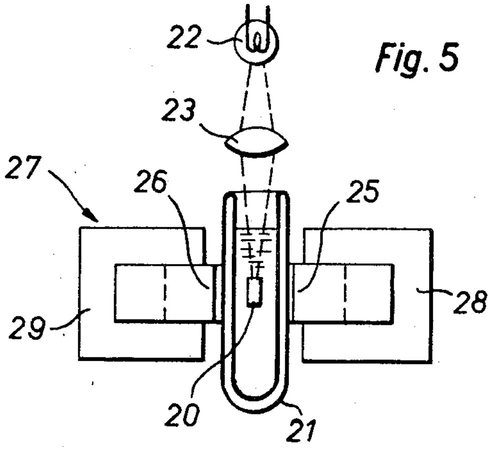
Figure 6:
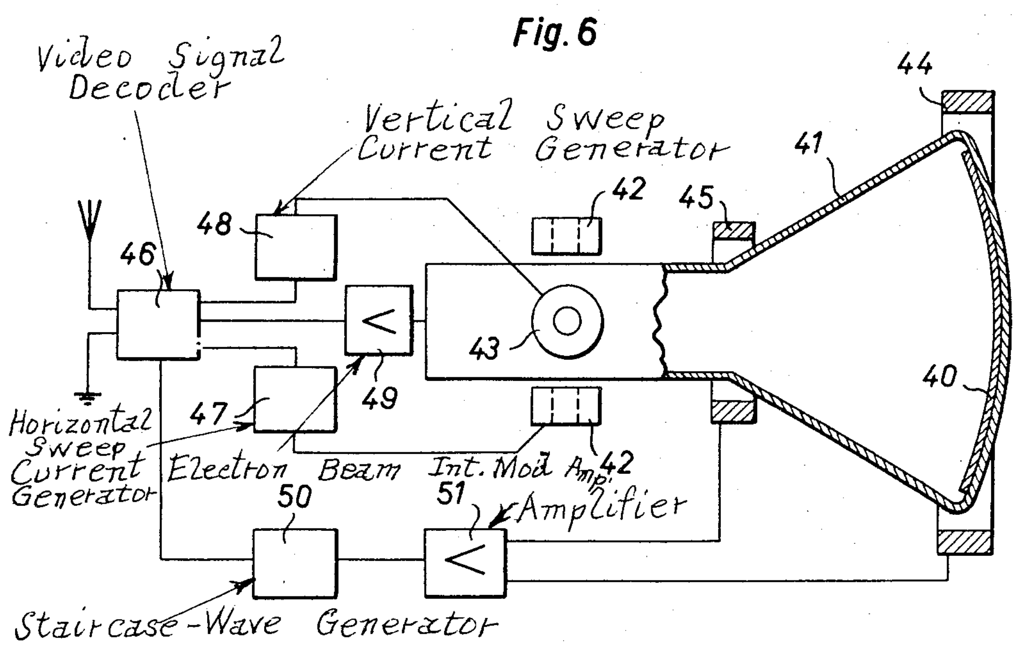
Figure 7:
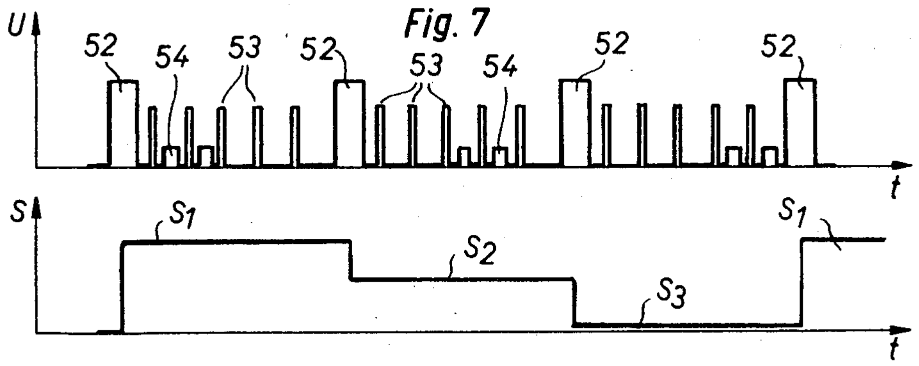
Figure 8:
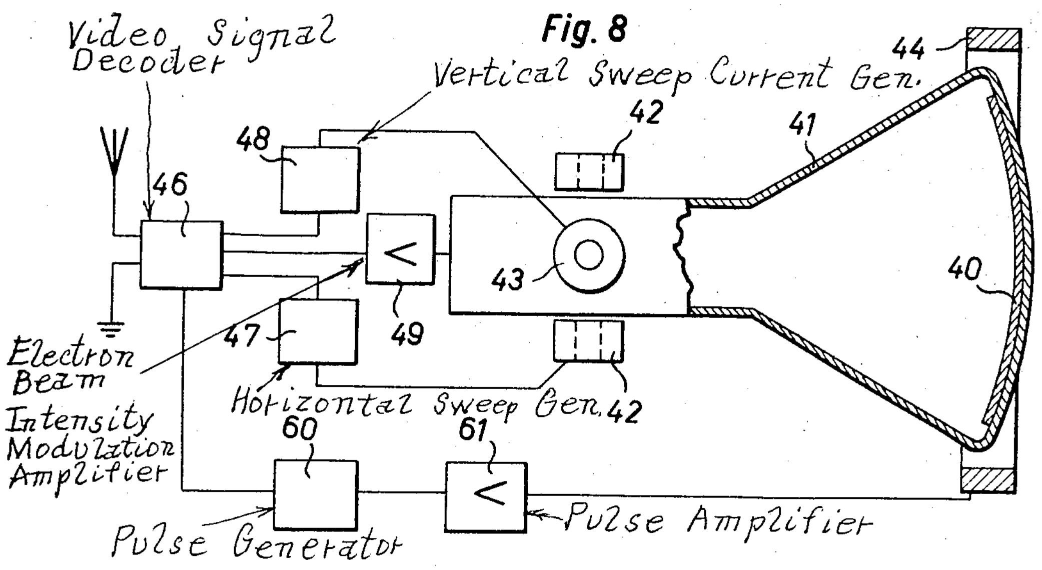
Figure 9:
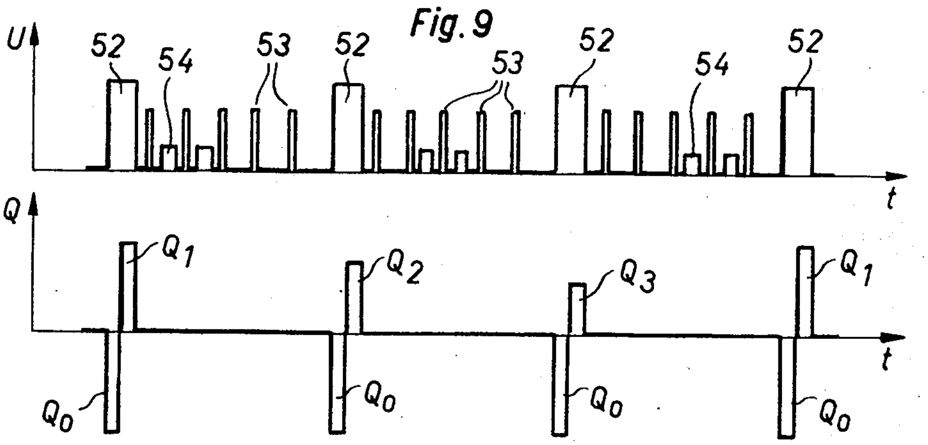
Figure 10:
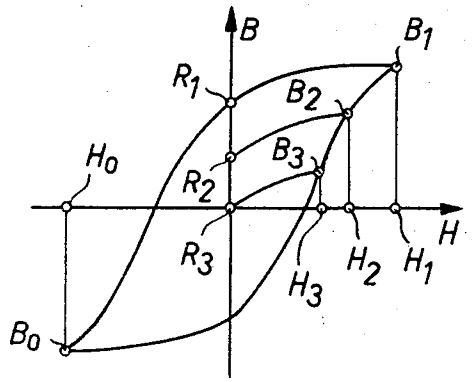
Figure 11:
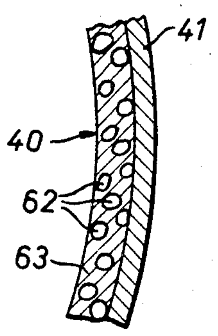
Figure 12:
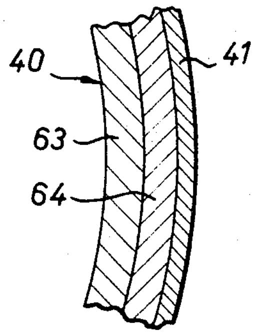
Figure 13:
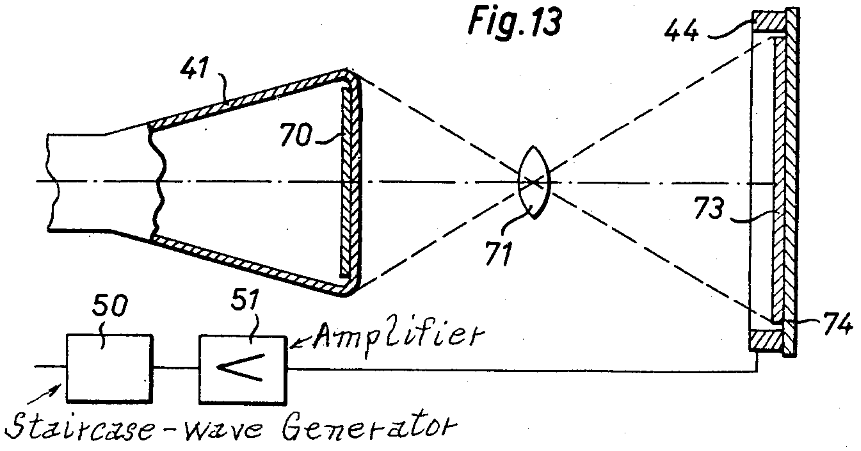
Figure 14:
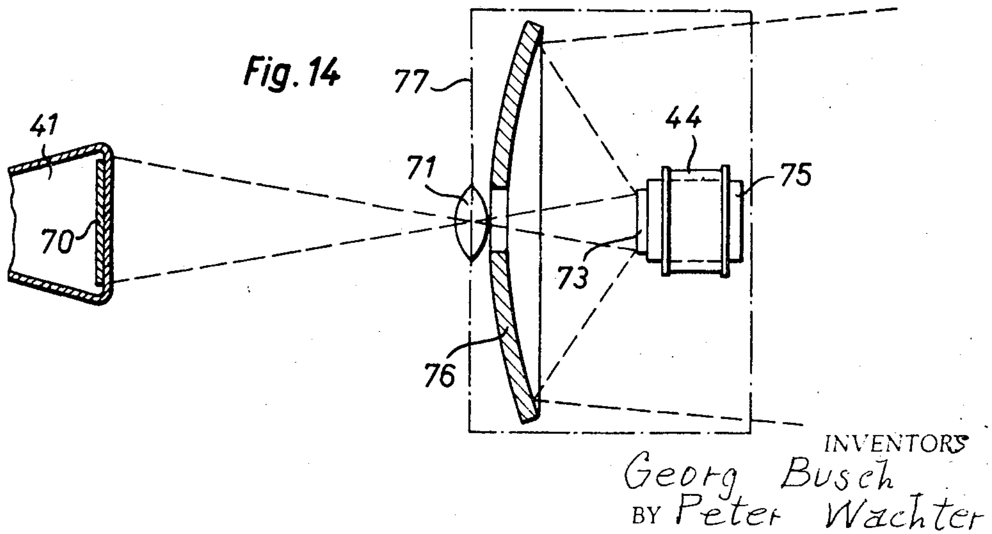

For the characteristics and details of the process according to the invention and of different applications of the process will become clear from the claims, from the description which will now follow of embodiments by way of example and from the pertinent drawings. As to the drawing of FIGS. 1 to 3, the process according to the invention will be explained, first of all, on the basis of the example of EuSe. In FIGS. 4 and 5 a laser with changeable emission color of the laser beam has been presented as an example of application of the process, while FIGS. 6 to 14 show several practical examples in the field of color TV. In detail the following is shown on the drawings:

FIG. 1 is a diagram of the spectral distribution of the luminescence of EuSe at a temperature of 5.2° K, once without magnetic field (curve *a*) and once under the influence of a strong magnetic field (curve *b*), FIG. 2 is a diagram showing in two curves the influence of the temperature on the wave length and on the intensity of the light at the emission maximum of EuSe, FIG. 3 is a diagram showing in two pairs of curves the influence of a magnetic field on the wave length and on the intensity of the light at the emission maximum of EuSe at temperatures of 2.3 °K and 5.8 °K, FIG. 4 is a schematic plan view of a device for the production of a laser beam with changeable emission color, FIG. 5 is a section taken on line V—V in FIG. 4 in the direction of the arrows, FIG. 6 is a schematic system of a first embodiment by way of example of a TV receiver for the production of color pictures according to the sequential process, FIG. 7 is a diagrammatic view showing the temporal courses of the received TV signals and of a magnetizing current for control of the luminescence color of the TV picture screen, FIG. 8 is a schematic system, analogous to that of FIG. 6, of a second embodiment by way of example of the color TV receiver which has a picture screen capable of luminescence with magnetic remanence characteristics, FIG. 9 is a side view diagram showing the temporal courses of the TV signals received and of magnetizing current impulses for control of the luminescence color of the TV picture screen, FIG. 10 is a diagram of a magnetizing curve for explanation of the method of operation of the TV receiver according to FIG. 8, FIGS. 11 and 12 are cross-sections showing two different variants of embodiments of the picture screen of the TV receiver according to FIG. 8, on a larger scale, FIG. 13 is a schematic view of a part of a third embodiment by way of example of the color TV receiver, in which a TV picture that constantly keeps the same color is projected optically on to a picture screen capable of luminescence, whose luminescence color is controllable, and FIG. 14 is a schematic view showing a similar further embodiment, by way of example, with a projecting device for the purpose of representation of the luminescence screen controllable in color on an ordinary projection screen.

EuSe is a substance capable of luminescence, in which the difference of energy between the upper edge of the last band filled with electrons and the lower edge of the first empty band (forbidden zone) amounts to 1.76 eV. Therefore, it will be possible to excite electrons of the filled band through light of sufficiently high energy (for example, by green light), so that they pass over into the empty upper band. These electrons will drop back into the lower band, at lower temperatures by an activator and emitting a light quantum. Defects in the crystal structure, such as, for example, displaced atoms, can act as activators in EuSe. The type of the activator is determined by the method of production. The emitted light is dark red at the temperatures of 5.2 °K, with a maximum in the spectral distribution at 850 m$\mu$, as shown by curve a in FIG. 1. One can demonstrate the luminescence up to a temperature of 100 °K, whereby, however, the intensity of the emission decreases and the color shifts somewhat toward shorter wave lengths (FIG. 2).

EuSe has a Curie-temperature of 4.6 °K, that is to say, in the vicinity of this temperature magnetic phenomena of order will take place. If one investigates, for example, at a temperature of 5.2 °K, the luminescence in a magnetic field, then the luminescence color, depending on the intensity of the field, will be shifted toward longer wave lengths, whereby the intensity of the emission decreases (curve *b* in FIG. 1). In the case of a magnetic field intensity of 19 kOe, the emission color becomes infra red. This color change is of an order of magnitude so that, if the emission would, for example, be in the green, a color change to orange would take place.

The changes of the emission color and of the intensity, caused by a certain variation of the magnetic field intensity, depend on the temperature prevailing at any one time. FIG. 3 shows the characteristics of the emission wave length $\lambda$ and of the emission intensity I of EuSe at temperatures of 2.3°K and 5.8°K as a function of the magnetic field intensity H. The curve designated with $\lambda$ 2.3°K or $\lambda$ 5.8 °K may be called "magneto optical" characteristic lines. It is apparent that these characteristic lines have at least an approximately linear part, whose transconductance changes with the temperature. This linear characteristic line part will be used in the case of most technical applications of the discovered process for the control of the emission color.

The understanding of the magnetic color change of EuSe was advanced by investigations of EuO, a ferromagnetic semiconductor. By absorption measurements below the Curie-temperature, it was found that there the forbidden zone in the magnetic field was greatly diminished. A similar effect also exists for EuSe. But it seems as though not only the energy of the forbidden zone was reduced, but also the energy differences between the free electrons and the activators. This explains the shifting of the emission toward smaller energies in the magnetic field. EuO, EuS and EuTe have properties very similar to those of EuSe, disclosed above.

In the case of some technical applications an effect, which occurs in the case of the above mentioned low temperatures, cannot be used immediately. However, magnetic compounds with much higher Curie-temperatures have already been found, for example $CdCr_2Se_4$ with a Curie-temperature of 190 °K and $CuCr_2Se_3Br$ with a Curie-temperature of 274°K, and it is practically certain that there are also such compounds with Curie-temperatures in the vicinity of room temperature. Also, there is a well-founded hope that magnetic compounds will be found whose energy gap permits a blue luminescence which can be continually shifted up into a red by a magnetic field.

The possibilities of technical application of the described process according to the invention are to be explained on the basis of two examples, the laser and the color TV.

Nowadays, almost any semiconductor can be brought to "laser-action" by admixture of characteristic disturbing atoms. This is also the case for EuSe and other magnetic compounds. As is well known, a laser operates only in a sharp emission line, the basic frequency and their higher harmonic. As mentioned before, it is possible, however, now to control the emission color by a magnetic field. Thus, a reliable possibility has been found for the first time, to produce a laser that can be harmonized or reconciled or modulated in its emission frequency. Thus the laser may be used, for example, like a monochromator, however with considerably greater advantages; higher resolving power, coherent light, higher intensity. The low Curie-temperatures of the magnetic compounds known hitherto are no obstacle for their application as a laser, since most known lasers are also operated at low temperatures.

An embodiment by way of example of such a new type laser has been shown schematically in FIGS. 4 and 5. A body 20, serving as a laser beam source, has been arranged in a double-walled glass container 21 for reception of a cooling fluid. The body 20 consists entirely or partially of a substance which is a magnetic chemical compound, capable of luminescence, which contains at least one chemical element with not terminated inner electron shell and simultaneously contains activators. The above described EuSe may be mentioned as an example of such a substance. The body 20 has been provided, in a known manner, on two outside surfaces facing each other with a reflecting layer, of which one of said outside surfaces is partially permeable. Above the vessel 21, an electric bulb 22, serving as a source for pumping light, has been arranged, the light being concentrated into the body 20 with the aid of a lens 23, in order to stimulate a laser beam in said body. The laser beam 24 emerges through the partially permeable reflecting layer of the body 20.

The vessel 21 has been arranged between the poles 25 and 26 of the electromagnet, which, in general, has been designated by 27 and which has two field coils 28 and 29 for excitation of a magnetic field between the poles 25 and 26. The body 20 is inside the above mentioned magnetic field. One field coil 28 has been connected to a source 30 of an electric current, which feeds a current of an adjustable but constant intensity to the coil 28. The other field coil 29 has been connected to the outlet of an amplifier 31, to the end 32 at which an electric control signal is fed, if desired. The emission color of the laser beam 24 is dependent on the field intensity of the magnetic field between the poles 25 and 26, and the magnetic field intensity on its part will result from the combined effect of the two field coils 28 and 29. By change of the current intensity, supplied by the source 30, the emission color can be reconciled to a desired wave length or vibration frequency. If an electric sequence of signals, for example, a low frequency alternating voltage, is applied to the entrance or end 32 of the amplifier 31, then the laser beam 24 will experience a frequency modulation, which can be used, for example, for a transmittal of communications of the laser beam.

Additionally, it has been shown in FIG. 4 that the laser beam 24 is thrown into an electro-optic intensity control device 34 by means of a lens 33 for the amplitude modulation of the laser vibration. The device 34 can be, for example, a Kerr cell, which obtains its control voltage from the outlet of an amplifier 35, an electric modulation signal being supplied by the entry 36 of said amplifier. The laser beam 37, modulated in its intensity, leaves the device 34 through a lens 38.

The frequency modulation and the amplitude modulation of the laser vibration can be used according to one's choice either separately or in combination, whereby the two types of modulations can be used simultaneously or periodically intermittently and interchangeably. In this manner it will be possible to create a large number of channels for the transmission of information, independent of one another.

The cooling liquid or fluid in the vessel 21 may be a liquefied gas and it has the task to keep the temperature of the body 20 constant on a value in which the desired change of the emission color of the laser beam, by the magnetic field of the magnet 27, will occur, that is, in other words, in which the "magneto-optic characteristic line" of the substance capable of luminescence, in the body 20, has a usable transconductance (FIG. 3).

There is mentioned color television as a second field of application. In the embodiment given by way of example and shown in FIG. 6 of a color TV receiver, the picture screen 40 of a Braun electron tube 41 has been produced from a magnetic compound, which can be excited to a blue luminescence by the cathode ray. The picture screen 40 has been developed uniform, just as in the case of a conventional black and white TV tube.

For the control of the focal spot of the electron ray across the picture screen 40, two pairs of sweeping coils 42 and 43 have been arranged in a known manner around the neck of the tube 41, which coils are shifted by 90° in relation to one another. The front end of the tube 41, having the picture screen 40, has been surrounded by a magnetic coil 44, which has the purpose of creating or generating a magnetic field, which will influence the substance of the picture screen 40, in order to control its luminescence color. A second magnetic coil 45 has been arranged at some distance from the picture screen 40, so that its magnetic field will have the least possible influence or action on the picture screen. The second coil 45 has the purpose to compensate for faults in the images which might occur, and which are brought about by the actions of the magnetic coil 44 on the electron beam, for which reason this coil will be called subsequently a compensation coil.

The TV signals, received by means of an antenna or by means of a cable, are first of all processed in a decoder 46. The latter controls a sweep current generator 47, which feeds the sweep coils 42 and a sweep-generator 48 for supply of the sweep coils 43. The decoder 46 also controls an amplifier 49 for the intensity modulation of the electron beam corresponding to the brightness of the image points. The apparatuses 46 to 49 would also be present in the case of a black and white TV receiver. According to FIG. 6 now, the decoder 46 has additionally been connected with a staircase-wave generator 50, which controls an amplifier 51 with two outlets, one of which feeds the magnetic coil 44 and the other the compensation coil 45.

With reference to FIG. 7, explanations are now given as to how a multi-color TV image will be produced with the receiving set described. The upper part of FIG. 7 shows, in a strongly schematic way, the temporal course of the TV signals U fed to the decoder 46. One can see the picture change impulses 52, the line jump impulses 53 and in between the signals 54 for the contents of the individual lines. Beside that, the TV signals U additionally comprise color control signals, which have not been represented or shown. In principle, it will suffice to allot a color synchronizing signal to every third picture change impulse 52. In the lower part of FIG. 7, the temporal course of the output voltage S of the generator 50 has been shown with the same time scale.

The generator 50 will be induced to put out a maximum voltage $S_1$ through the first picture change impulse 52, which voltage will remain constant until the arrival of the second picture change impulse. By means of the amplifier 51, a current in proportion to the voltage $S_1$ is fed to the magnetic coil 44, which current excites a maximum excitation of the magnetic coil 44 during the entire time of the first image. The substance, forming the picture screen 40, will be influenced by the magnetic field of the coil 44 in such a manner, that the luminescence color of the picture screen 40 will be red. The image appearing on the screen 40 is that of a red color record of the multi-color image that is to be transmitted. The generator 50 will be induced through the second picture change impulse 52 to put out a smaller voltage $S_2$, which remains constant until the arrival of the third picture change impulse. Consequently, the excitation of the magnetic coil 44 will be correspondingly smaller than before during the entire duration of the second image, so that the substance of the picture screen 40 will be less strongly magnetized. The luminescence color of the screen 40, therefore, will be green, and the image appearing on the screen 40 is that of a green color record of the multi-color picture that is to be transmitted. The consequence of the third picture change impulse 52 is, that the output voltage $S_3$ of the generator 50 for the duration of the third image will be at least approximately zero and the magnetic coil 44 will produce no magnetic field. The luminescence color of the screen 40 is then blue and the image appearing on the screen 40 is that of a blue color record of the multi-color picture to be transmitted. On arrival of the next picture change impulse 52, the generator 50 will again be induced to put out the maximum voltage $S_1$, after which the described processes are repeated periodically. The temporal sequence of the various monochromatic color records on the picture screen 40 occurs more rapidly than the reaction of the human eye, so that the viewer of the picture screen will receive the impression of a multi-color TV image.

The amplifier 51 likewise supplies a current, proportional to the staircase wave S to the compensating coil 45 for the step-by-step excitation of the coil 45. The magnetic effect of the compensation coil 45 on the electron beam of the picture tube 41 is opposite to that of the magnetic coil 44 and balances out the image defects caused by the magnetic coil 44 without considerably magnetically influencing the substance of the picture screen 40. The compensation of the image defects could, if need be, also be carried out with the aid of the customary deflecting means 42 and 43, instead of carrying them out with the special compensation coil 45. For this purpose the staircase-like output voltage S of the generator 50 would be fed, for example, to the apparatuses 47 and 48 for feeding the deflecting means 42 and 43.

Another embodiment of the arrangement for receiving of multi-color TV images, by way of example, has been shown schematically in FIG. 8. Insofar as there is agreement or conformity with the just described example according to FIG. 6, the same reference symbols have been used. The differences are as follows: The compensation coil 45, FIG. 6, of a device with a similar effect has been omitted, since it is not needed here. The picture screen 40 consists of a magnetic substance capable of luminescence, which, in addition to the characteristics enumerated in the previous example, has remanence characteristics, that is to say it is capable of retaining a magnetization imparted to it even though the source of the magnetic field be switched off. Furthermore, the staircase wave generator 50 has been replaced by an impulse generator 60, at the outlet of which a sequence of short voltage impulses Q will occur, as has been shown in the lower part of FIG. 9. An impulse amplifier 61 has been connected to the generator 60 at the outlet side, which feeds the magnetic coil 44.

For an explanation of the method of operation, reference is had to FIGS. 9 and 10. In the upper part of FIG. 9, the temporal course of the the TV impulses U fed to the decoder 46 has been presented in the same manner as has been described in relation to FIG. 7. Upon arrival of the first picture change impulses 52, the generator 60 is induced to produce in immediate sequence, first of all a negative voltage impulse $Q_0$ and then a positive voltage impulse $Q_1$. The magnetic coil 44 is fed with current impulses by means of the amplifier 61, which current impulses are proportional to the current impulses Q. The impulse $Q_0$ has as a consequence a magnetic field, whose field intensity amounts to $H_0$ and has, for example, a negative polarity. According to FIG. 10, this field intensity H causes a magnetization $B_0$ in the substance of the picture screen 40, which makes every other positive magnetization of the substance disappear, that might have been present previously. One can then call the impulse $Q_0$ an extinguishing impulse. The subsequent impulse $Q_1$ causes a field intensity $H_1$ of an opposite, that is, of a positive polarity, as a result of which a magnetization $B_1$ will be brought about in the substance of the picture screen 40. Whenever the impulse $Q_1$ has been concluded, the magnetization $B_1$ returns to the remanence value $R_1$, which will be maintained by the substance of the picture screen until the arrival of the next extinguishing impulse $Q_0$. The remanence $R_1$ is so great that under its influence the luminescence color of the picture screen 40 is red. The TV image following the impulse $Q_1$ is a red color record of the multi-color image to be transmitted. The second picture change impulse 52 induces the generator 60 to produce a negative extinguishing impulse $Q_0$ and an immediately succeeding color change impulse $Q_2$. The extinguishing impulse again has for a consequence a negative magnetization $B_0$ of the picture screen substance, whereupon the impulse $Q_2$ will cause a positive field intensity $H_2$ of the magnetic field created by the coil 44 and a magnetization $B_2$ of the picture screen. At the end of the impulse $Q_2$, the magnetization returns to the remanence value $R_2$. The remanence $R_2$ is such that, under its influence, the luminescence color of the picture screen 40 will be green. The subsequent TV image is a green color record of the multi-color image to be transmitted. The third picture change impulse 52 produces, first of all, again an extinguishing impulse $Q_0$ and subsequently a picture change impulse $Q_3$. The latter has as a consequence a magnetization $B_3$ of the picture screen 40, which at the end of the impulse $Q_3$ returns to the remanence $R_3$, which is at least approximately zero. During the now following third TV image, the screen 40 is practically not magnetized, for which reason the luminescence color will be blue. Consequently, the image corresponds to a blue color record of the multi-color image to be transmitted. Upon arrival of the fourth picture change impulse, a new cycle of the various monochromatic images will start because of the reaction time of the human eye, so that a viewer of the picture screen has the impression of a multi-color TV image.

The substance of the picture screen 40, which is capable of luminescence, does not in every instance have to have magnetic remanence characteristics itself. FIG. 11 shows in a greatly enlarged sectional image, that the grains 62 of a pulverized other substance with remanence characteristics, for example, of a ferrite in fine distribution, can be mixed in among the substance 63 which is capable of luminescence, whereby an even or an irregular distribution of the two substances 62 and 63 is possible. It will be advantageous if the grains 62 of the material capable of luminescence are transparent or permit the light to shine through. Another variation has been shown in FIG. 12. In this instance, the inside of the front end wall of the electron ray tube 41 has been covered, first of all, with a transparent layer 64, made of a magnetic material capable of remanence. This layer 64 has been produced, for example, by steaming on in the vacuum. A second layer 63 of a magnetic substance capable of luminescence has been applied to the remanence layer 64. In both cases the method of operation is the same as previously described in relation to FIGS. 8 to 10.

A further embodiment of a TV receiving set, by way of example, has been partially shown in FIG. 13, which has been intended as a variant to FIG. 6 and which differs from the first embodiment given by way of example in the following points: the Braun electron ray tube 41 has an ordinary picture screen 70 as is customary, for example, in the case of oscillograph tubes or in the case of black and white TV tubes. The various color records of the multi-color image that is to be transmitted, succeeding each other temporally, are thus depicted on the picture screen 70 in the same luminescence color. These images are thrown on to a second picture screen 73 optically with the aid of a lens 71, which second picture screen has been arranged on a transparent carrier plate 74 at some distance from the cathode ray tube 41. This second picture screen 73 consists of the same magnetic substance capable of luminescence, as the picture screen 40 of the first embodiment shown by way of example in FIG. 6. The magnetic coil 44, which is fed by the current supplied by the amplifier 51, has been arranged around the edge of the picture screen 73. A compensating coil 45 is not required in the case of this design. While the cathode ray of the tube 41 draws the first TV image corresponding to the red color record on the picture screen 70, the focal point of the cathode ray is depicted on the second picture screen simultaneously by means of the lens 71, said second picture screen 73 now being likewise excited to luminescence. By control of the staircase wave generator 50, the magnetic coil 44 is excited with the maximum intensity with the help of the amplifier 51 during the entire duration of the first picture. The magnetic field which develops will influence the substance of the picture screen 73 in such a manner, that its luminescence color will be red. While the second TV image is being drawn on to the picture screen 70 of the tube 41, the substance of the picture screen 73 will be less strongly magnetized than before, by the effect of the magnetic coil 44, so that the luminescence color of the screen 73 will be green. Whenever the third TV image appears on the picture screen 70, practically no current will flow through the coil 44. Then the luminescence color of the picture screen 73 will be blue. Although all color records are rendered in the same color on the picture screen 70 of the electron ray tube 41, they will appear on the second picture screen 73 alternatingly red, green and blue, so that a viewer of the second picture screen 73 will obtain the impression of a multi-colored TV image. The TV screen 73 can be observed according to choice in viewing through the carrier plate 74 or in vertical projection from the other side. If one so desires, the two picture screens 70 and 73 could have considerably differing dimensions. Thus, it will be possible to produce a comparatively speaking large colored TV picture on the screen 73 using a relatively small black and white TV tube 41.

The further embodiment presented in FIG. 14, by way of example, differs from the one just described by the fact, that the second picture screen 73, capable of luminescence, has been arranged on an outside surface of a not transparent body 75 made of magnetically conductive material, for example, of a ferrite. The magnetic coil 44 has been placed around the body 75. The picture screen 73 is thrown, with the help of a mirror lens 76, on to a projection screen, not shown, and arranged at a fairly large distance from said lens, which screen can be developed, for example, in the manner of a movie screen. The body 75 with the picture screen 73 and the coil 44, as well as, for practical purposes, also the mirror lens 76, and if need be the lens 71, are housed in a housing 77 which, in FIG. 14, has been shown merely schematically and which contains means for keeping the temperature of the enclosed parts constant, in order to maintain the substance forming the picture screen 73 at the most favorable operating temperature, at which the magneto-optic characteristic line of the above mentioned substance will have a usable transconductance. Whenever the body 75 has magnetic remanence characteristics, it will be much to the purpose to carry out the color and change of the luminescence color of the picture screen 73 by short impulses $Q_0$, $Q_1$, $Q_2$ and $Q_3$, as was explained with relation to FIGS. 8 to 10.

Sequential color TV processes, in which varying color records are transmitted in temporal sequence, have been known per se; however, up until now they would have the disadvantage that both on the transmitting side as well as on the receiving end, mechanically moved, for example, rotating color screen disks were required. By this present and above explained invention, such mechanically moved parts will be avoided, at least in the receiving set, since the sequential color control is brought about by change of a magnetic field.

A further considerable advantage of the described receiving devices for color TV images, according to the invention, lies in the fact that an electron ray tube with a uniform fluorescent screen suffices, which can be produced in a relatively simple manner, in contrast to the color TV tubes mostly customary hitherto. In the case of those tubes, the fluorescent screen consists of red, green and blue luminescent parts joined together in the manner of a mosaic. Three electron guns must be present, and each of these only illuminates one kind of the above mentioned luminescent screen parts on the basis of its position in space, by a grid in front of the luminescent screen. The luminescent screen itself cannot be produced through sedimentation of the luminescent substances in a liquid, but must be steamed on. For that purpose, steaming on apparatuses will be attached at the same places of the TV tube on which will be later on found the electron guns, which will stream through the same grid which is passed through later on by the electrons, on to the screen first the red, then the green and then the blue luminescent substances.

This known production process is so complicated, that at the present time production of color TV tubes in America lags behind production of the entire electronic system of the TV apparatus, for which reason the demand for color TV receivers cannot be satisfied immediately. Moreover, the quality of the color TV picture has been suffering hitherto because of the fact that the definition of a picture is very crude, since, for example, the red luminescent grains have 3 times as great a distance one from the other than have the grains of a black and white TV tube, because the green and the blue grains are distributed between the red grains, in addition.

We claim:

1. Device for the production of multi-colored TV images by a temporal sequence of monochromatic images corresponding to various color records of the original image to be transmitted, comprising a picture screen made of a substance capable of luminescence arranged in the optical picture path of the TV picture to be produced, the substance capable of luminescence and forming the picture screen being a magnetic chemical compound containing as a compound partner at least one chemical element with no terminated inner electron shell and activators, a magnetic field influencing the substance which is capable of luminescence, and means for the step-by-step change of the magnetic field in dependence on color control information contained in the TV signals to control the luminescence color of the picture screen.

2. Device according to claim 1, in which a magnetic coil and a sweep element are provided with the picture screen, having a variable luminescence color of a Braun electron tube and it lies within the area of effectiveness of the magnetic coil for the production of a magnetic field influencing the substance capable of luminescence, and the sweep element serving for the deflection of the electron beam provided for compensation of the image distortion caused by the magnetic coil and it is fed by an electric value which changes with the intensity of the current exciting the magnetic coil.

3. Device according to claim 1, in which the substance of the picture screen, which is capable of luminescence, has magnetic remanence characteristics and is located within the area of effectiveness of at least one magnetic coil, the pulse-like excitation of which is the remanence of the substance capable of luminescence, and thus the luminescent color, are changeable.

4. Device according to claim 1, in which a material with magnetic remanence is provided mixed in fine dispersion into the substance of the picture screen, which is capable of luminescence, and the picture screen being located within the range of effectiveness of at least one magnetic coil by the pulse-like excitation of which the remanence of the admixed material and thus the luminescence color of the picture screen is changeable.

5. Device according to claim 1, in which the substance of the picture screen, which is capable of luminescence, is a coating on a layer of material with magnetic remanence characteristics, said layer being located in the area of effectiveness of at least one magnetic coil by the pulse-like excitation of which the remanence of the layer and the luminescence color of the picture screen is changeable.

6. Device according to claim 1, in which a magnetic coil and means for the pulse-like feeding of the magnetic coil are provided so that they will excite the magnetic coil every time only between successive images.

7. Device according to claim 1, in which a one-colored Braun electron ray tube is provided with the picture screen, having a variable luminescence color, and the picture screen of the ray tube has been depicted through optical means, whereby the two picture screens are arranged separate one from the other, and only the picture screen with a variable luminescent color is located within the area of effectiveness of the magnetic field for the control of the luminescence color.

8. Device according to claim 1, in which the picture screen having a variable luminescence color is arranged in a device with means for the regulation of the temperature.

* * * * *